April 16, 1968 J. H. WEGGELAND 3,377,727
PICTURE VIEWER
Filed June 1, 1966
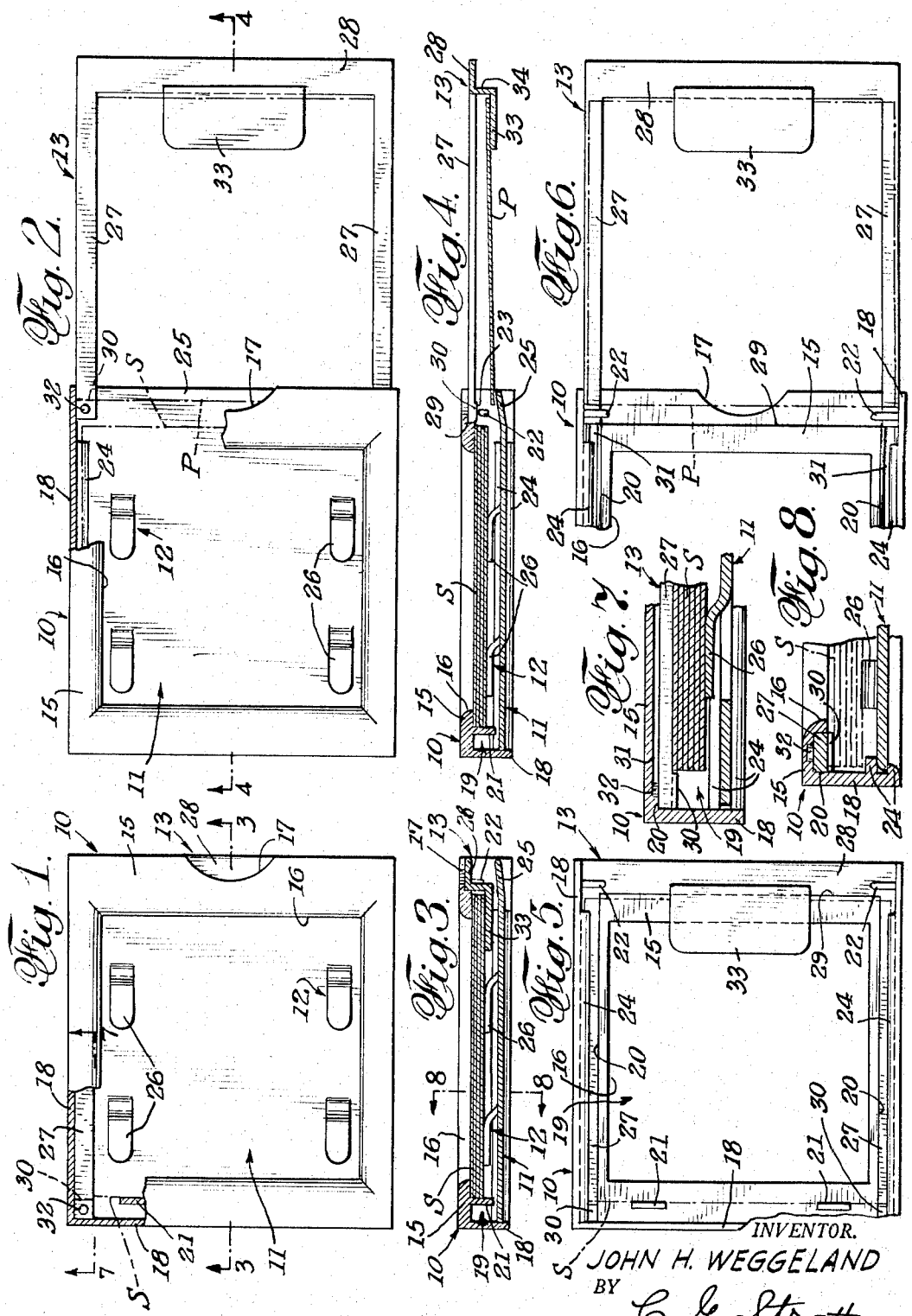
INVENTOR.
JOHN H. WEGGELAND
BY
C. G. Stratton
ATTORNEY

United States Patent Office 3,377,727
Patented Apr. 16, 1968

3,377,727
PICTURE VIEWER
John H. Weggeland, 9137 Lilienthal Ave.,
Los Angeles, Calif. 90045
Filed June 1, 1966, Ser. No. 554,370
7 Claims. (Cl. 40—79)

This invention relates to a picture viewer and has for an object to provide a manually operable device for holding a stack of pictures so the top picture of the stack is exposed and means to transfer said top picture to the bottom of the stack, thereby exposing the second picture of the original stack. The term "picture," in the following description and in the claims, is intended to describe a rectangular sheet of more than paper thickness (about 1/64" being exemplary) and bearing on its face a photo, drawing, written or printed material, a calendar month, or other pictorial, educational, or entertaining material.

Another object of the invention is to provide a picture viewer, as characterized, that by shuttle action, effects the transfer of pictures successively from the top to the bottom of a stack thereof and keeping the pictures in their initial sequence during such transfer.

This invention also has for its objects to provide such means that are positive in operation, convenient in use, easily installed in a working position and easily disconnected therefrom, economical of manufacture, relatively simple, and of general superiority and serviceability.

The above objects are realized in a device that comprises a frame provided with means having resilient bias that presses on the bottom of a stack of pictures disposed in the frame, and a shuttle that is laterally slidable between a contracted position in register with the frame and an extended position at one edge of the frame. The shuttle is provided with shoulder or stop means that engages the rearward edge of the topmost or exposed picture of the stack and, when the shuttle is manually moved to extended position, causes said shoulder or stop means to slide said topmost picture from the stack and accompany the shuttle to its extended position. When freed from engagement with the remainder of the stack, the front edge of the picture drops upon a support ledge on the forward end of the shuttle and the rear edge thereof drops upon a closure for the bottom of the frame and which includes the stack-biasing means. Said dropped picture, now being disposed below the bottom of the stack, is slidable by the shuttle to a position at the bottom of the stack, when the shuttle is retracted. Now, the second picture of the original stack is exposed. The above action may be repeated until all of the pictures, sequentially, are displaced from the top to the bottom of the stack.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a partly broken plan view of a picture viewer according to the present invention, with the shuttle in contracted condition.

FIG. 2 is a similar view with the shuttle extended.

FIGS. 3 and 4 are longitudinal sectional views as taken, respectively, on the line 3—3 of FIG. 1 and 4—4 of FIG. 2.

FIGS. 5 and 6 are bottom views, the latter being broken away, of the viewer in the respective positions of FIGS. 1 and 2.

FIGS. 7 and 8 are enlarged fragmentary sectional views as taken on the respective lines 7—7 of FIG. 1 and 8—8 of FIG. 3.

The present picture viewer comprises, generally, a frame 10, a closure 11 for the bottom of said frame and provided with means 12 for imposing an upward bias on a stack of pictures S disposed in said frame, and a U-shaped shuttle or slide 13 mounted in the frame and manually movable, back and forth, in a shuttle or reciprocative movement to remove the topmost picture P of the stack and replace the same at the bottom of the stack. The above elements may be made of any suitable material and are advantageously made of high-impact synthetic plastic.

The frame 10, preferably of rectangular form, comprises a top face 15 that frames an opening 16. On one edge of said face is provided a finger recess 17. A skirt 18, of any suitable height, spaces said face 15 from the bottom of the frame, defining a stack-accommodating space 19. In the bottom of frame face 15, on both sides thereof, are provided elongated grooves 20. Stack-locating lugs 21 extend downwardly from said face bottom inwardly of the left ends of said grooves. At the right end of the frame 10, are provided gate lugs 22 that are spaced as at 23, from said face bottom a distance larger than the thickness of a picture P but smaller than two such thicknesses. It will be noted that the skirt 18 is omitted from the right end of the frame where the lugs 22 are located, being provided only at the three other ends, left, top and bottom, of the frame 10. Along the bottoms of the top and bottom ends of the skirt, are provided spaced cleats 24 for holding the closure 11.

Said closure 11 is shown as a rectangular plate member having either sliding or snap-on engagement with said cleats 24, the right end 25 of said closure extending the gates 22, as may be seen in FIG. 4. The means 12 is shown as resilient fingers 26 that are punched or otherwise formed to extend upwardly from the closure plate 11. Instead of such fingers, other suitably formed embossment may be provided for pressing upwardly on the bottom picture of a stack to resiliently bias the stack into light contact with the bottom of the frame face 15.

The shuttle 13 is shown as U-shaped and comprising two longitudinal arms 27 of a width to slidingly fit the grooves 20 in the frame face 15, and a cross bar 28 connecting the right ends of said arms, the latter fitting into a rabbet 29 in said frame face when the shuttle is retracted, as in FIG. 3. The under faces of the arms 27 are preferably flush with the under side of face 15, a shoulder 30 on the left end of each said arm projecting below said under side. The two shoulders 30 are leftward of the left corners of the topmost picture and, therefore, project into abutting engagement with said picture to push the same off the top of the stack when the shuttle is moved toward the right. Blind-ended countergrooves 31 in the frame face 15, by engagement with pins 32 provided on the left ends of the shuttle arms 27, limit the movement of the shuttle at the retracted and projected or extended positions, as shown. The movement of the shuttle to the right is stopped when the trailing edge of the picture P being shifted clears both the stack S and the gates 22, as can be seen in FIGS. 4 and 6. A ledge 33 offset downwardly from the plane of the shuttle and the mentioned right edge portion 25 of the closure plate 11 cooperate to catch the shifted picture P as the same falls downward after clearing the stack. In this condition of the viewer, two pictures are exposed, the one that was shifted and the next picture at the top of the stack.

From this position, the shuttle is slid to retracted position, the wall 34 of the ledge 33 pushing the picture to the left between the bottom of the stack and the biasing fingers 26. Now, the full stack is disposed in the frame 10, but the original topmost picture is at the bottom, leaving the next picture of the stack exposed.

As can be seen, the present viewer is operable with the frame 10 horizontal or approximately so, the picture moved by the shuttle of the stack, thereby dropping properly on the ledge 33 and the portion 25.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A picture viewer comprising:
   (a) a rectangular frame having a top face with an opening therein and provided with a skirt around three edges of the face defining a space to accommodate a stack of pictures,
   (b) a member across the bottom of the frame provided with means to impose a resilient bias against the bottom of the stack to press the topmost picture against the under side of the face of the frame,
   (c) a shuttle slidably mounted in said frame and guided therein for movement between retracted position within the confines of the frame and extended position beyond the fourth edge of the frame face,
   (d) pusher means on the shuttle to engage against the edge of the topmost picture that is opposite said fourth edge of the frame face and carried by the shuttle, when the latter is extended, to a position beyond the remainder of the stack and, thereby released to fall gravitationally,
   (e) a portion of said member across the bottom and a ledge on the shuttle intercepting the released picture to hold the same at a height below the lowermost picture and in laterally offset relation with the newly exposed topmost picture of said remainder of the stack, and
   (f) a portion on the shuttle to abut against the other edge of said released picture to transport said picture to a position at the bottom of the stack when the shuttle is returned to retracted position.

2. A picture viewer according to claim 1 in which the under face of the top face of the frame is formed with longitudinal guide grooves adjacent the two opposite frame edges having skirt portions, and the shuttle being provided with parallel arms slidably fitted into said grooves with the under faces thereof flush with said under face of the top face of the frame, the mentioned pusher means on the shuttle being provided on the ends of said arms and extending below said flush faces.

3. A picture viewer according to claim 2 in which the shuttle and frame are provided with cooperating portions that limit the retracted and extended positions of the shuttle, the means to limit the extended position being located adjacent the edge of the frame that is skirtless.

4. A picture viewer according to claim 3 provided with gate means spaced below said flush surfaces a distance greater than the thickness of a picture and smaller than twice such thickness, said gate means being located beyond the stack-accommodating space at the skirtless edge of the frame.

5. A picture viewer according to claim 1 in which the mentioned skirt is provided with portions to separably engage edge portions of the mentioned member across the bottom of the frame so said member may be removed to afford access to the mentioned space for removing and inserting stacks of pictures.

6. A picture viewer according to claim 2 in which the shuttle is provided with a cross bar connecting the extending ends of the parallel arms thereof, the picture-supporting ledge being mounted on said bar and downwardly offset from the plane of the top face of the frame and of the shuttle arms guided therein.

7. A picture viewer according to claim 1 in which the ledge is connected to the cross bar of the shuttle by the mentioned portion of the shuttle to abut the edge of the released picture.

References Cited
UNITED STATES PATENTS 888,958   5/1908   Busald _____ 40—79

EUGENE R. CAPOZIO, *Primary Examiner.*

W. H. GRIEB, *Examiner.*